UNITED STATES PATENT OFFICE.

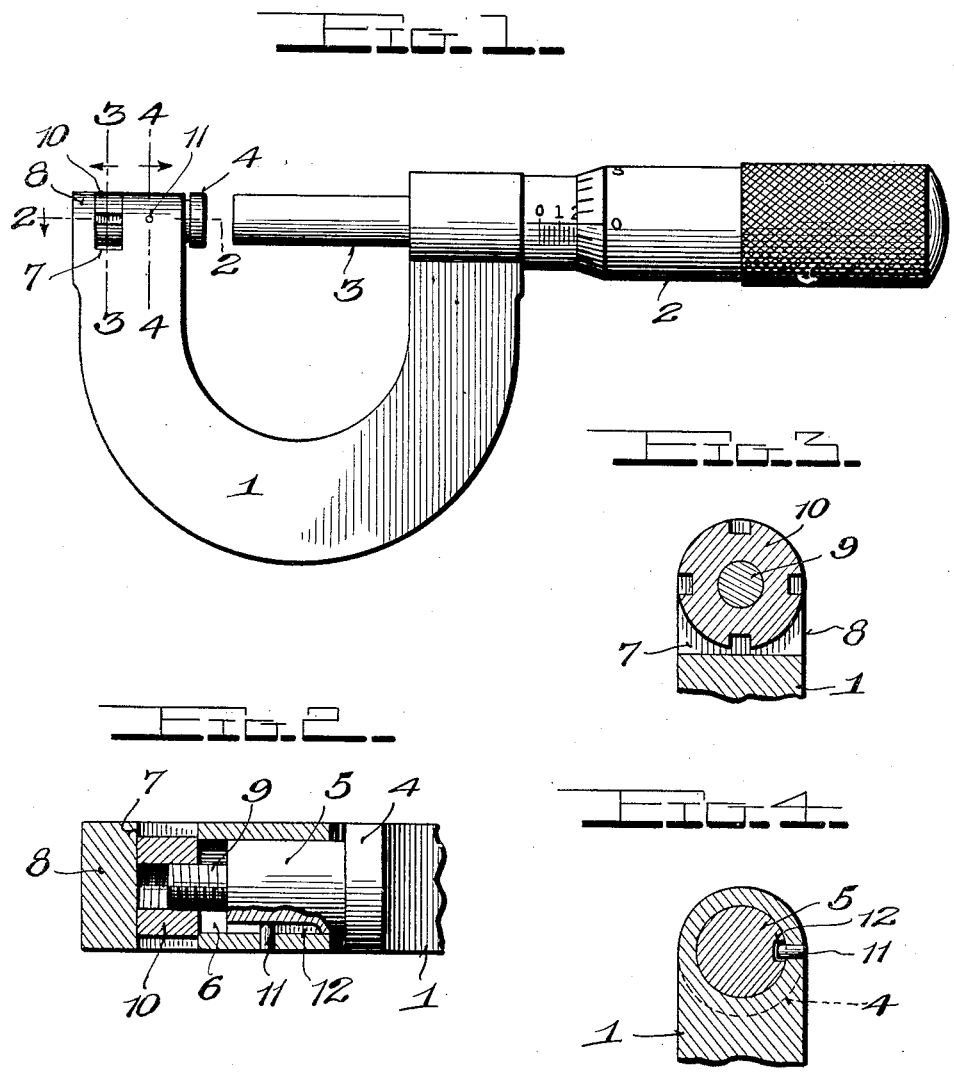

FRANK SPALDING, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

CALIPER.

1,333,943.     Specification of Letters Patent.     Patented Mar. 16, 1920.

Application filed March 1, 1919. Serial No. 280,022.

*To all whom it may concern:*

Be it known that I, FRANK SPALDING, a citizen of the United States, residing at Providence, in the county of Providence and State of Rhode Island, have invented a new and useful Improvement in Calipers, of which the following is a specification.

This invention relates to certain new and useful improvements in a caliper, and especially of the micrometer type, the invention residing in an improved spindle and an adjustable mounting therefor.

The principal object is to provide a construction wherein the usual wear on the anvil spindle may readily be compensated for and the accuracy of the instrument maintained.

The invention further resides in the salient features of construction and their arrangement as hereinafter described and claimed, reference being had to the accompanying drawing wherein—

Figure 1 is a side elevation of the caliper embodying the present invention.

Fig. 2 is a longitudinal section on line 2—2 of Fig. 1 through the anvil spindle.

Figs. 3 and 4 are transverse detailed sections on lines 3—3 and 4—4, respectively, further showing the construction and mounting of the spindle.

Referring more in detail to the drawing, the numeral 1 designates the frame or yoke of the caliper having the micrometer adjustment 2 on one end for advancing its spindle 3 toward the anvil spindle 4, the latter provided with a reduced stem part 5 which is slidably supported in a bearing 6 in the opposite end of the caliper frame. This bearing 6 opens into a transversely arranged slot 7 that is defined on its opposite side by a solid abutment or wall 8.

The cylindrical stem or body 5 is provided with a screw extension 9 projecting into the transverse slot 7, and situated in this slot is a nut 10 threaded on the screw extension whereby on turning the nut the screw extension and its integrally connected body of the spindle 4 are slid longitudinally within the bearing 6 toward and from the micrometer spindle 3. The spindle body 5 is held against turning with the nut by means of a pin 11 projecting from the bearing into a lengthwise groove 12 in the periphery of the body 5.

In practice, the nut is preferably formed with a series of peripheral notches for receiving a spanner wrench to facilitate the turning of the nut and consequently effecting adjustment of the anvil spindle. With the micrometer adjustment set at zero, the anvil spindle is then advanced into contact with the micrometer spindle. The parts are in this manner accurately set quickly and easily.

In calipers of this type it is customary to form the active face of the anvil spindle of a comparatively soft metal which is subject to much wear and early renders the instrument inaccurate because of the loss of the fractional part of an inch through such wear. The advantages of the present construction are therefore very obvious together with the efficiency and practicality of the instrument.

Having thus described my invention, what I claim as new and desire to secure by Letters Patent is—

1. In a caliper, a substantially U-shaped frame, a micrometer spindle carried by one leg, the opposite leg of the U-frame formed with a transverse slot and a hollow bearing opening through one side thereof, its opposite side defined by a solid abutment, an anvil spindle having one end reduced in diameter and screw threaded, said anvil spindle slidably fitting the bearing and the reduced, screw threaded end projecting into the slot, said anvil spindle being provided with a groove, a pin extending into the bearing and operating in the groove to hold the spindle from turning, and a nut disposed in the slot and engaged with the screw to effect adjustment of the anvil spindle, said nut having peripheral notches to receive a spanner wrench.

2. In a caliper, a V-frame having a micrometer spindle on one end, the opposite end of the frame formed with a tubular bearing, an anvil spindle slidable within the bearing, a fixed solid abutment alined with and spaced from the outer end of the bearing to provide an interposed slot, and means interposed within the slot between the abutment and the adjacent end of the bearing and disposed within the body lines of the bearing and abutment for engaging the anvil spindle to thereby adjustably slide the same.

3. In a caliper, a frame having a tubular bearing extending longitudinally part way therethrough and a transverse slot communicating with one end thereof, a nut disposed in the slot, and a spindle slidable in the bearing and having a threaded part engaged with the nut for adjustment thereby, said threaded part being shorter than the bearing whereby the spindle is prevented from being advanced entirely out of the bearing.

4. In a caliper, a frame having a bearing and a slot extending tranversely of and communicating therewith, a headed spindle slidably fitting the bearing and provided with a reduced screw part shorter than the bearing and extending into the slot, means for holding the spindle from turning, and means within the slot engaging the screw part for advancing and retracting the spindle.

In testimony whereof I have signed my name to this specification in the presence of two subscribing witnesses.

FRANK SPALDING.

Witnesses:
ADA E. HAGERTY,
J. A. MILLER.